United States Patent
Mao et al.

(10) Patent No.: US 11,522,786 B2
(45) Date of Patent: Dec. 6, 2022

(54) PACKET FORWARDING PATH DETERMINING METHOD, DEVICE, AND SYSTEM

(71) Applicant: HUAWEI TECHNOLOGIES CO., LTD., Shenzhen (CN)

(72) Inventors: Haiyan Mao, Beijing (CN); Bing Liu, Beijing (CN); Sheng Jiang, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 82 days.

(21) Appl. No.: 16/931,369

(22) Filed: Jul. 16, 2020

(65) Prior Publication Data

US 2020/0351193 A1 Nov. 5, 2020

Related U.S. Application Data

(63) Continuation of application No. PCT/CN2019/091922, filed on Jun. 19, 2019.

(30) Foreign Application Priority Data

Sep. 11, 2018 (CN) .......................... 201811055746.7

(51) Int. Cl.
*H04L 45/12* (2022.01)
*H04L 43/0829* (2022.01)
(Continued)

(52) U.S. Cl.
CPC .......... *H04L 45/123* (2013.01); *H04L 43/087* (2013.01); *H04L 43/0829* (2013.01); *H04L 45/124* (2013.01); *H04L 45/74* (2013.01)

(58) Field of Classification Search
None
See application file for complete search history.

(56) References Cited

U.S. PATENT DOCUMENTS

8,289,845 B1 * 10/2012 Baldonado .............. H04L 43/16
370/230
9,124,529 B1 * 9/2015 Chadha .................... H04L 45/02
(Continued)

FOREIGN PATENT DOCUMENTS

CN 101047633 A 10/2007
CN 101436998 A 5/2009
(Continued)

*Primary Examiner* — Christine T Duong
(74) *Attorney, Agent, or Firm* — Rimon PC

(57) ABSTRACT

Various embodiments provide an example method in which a first measurement packet can be generated. The first measurement packet includes link resource indication information, and the link resource indication information in the first measurement packet is configured to indicate each node on a forwarding path of the first measurement packet to perform local link resource measurement. In those embodiment, the first measurement packet can be sent to a next device on the forwarding path, where the first measurement packet includes local link resource information measured by the first device. Still in those embodiments, until the first measurement packet is forwarded to a third device by each node on the forwarding path of the first measurement packet, the third device receives the first measurement packets sent on different forwarding paths, and determines a path meeting the link resource indication information.

8 Claims, 9 Drawing Sheets

(51) Int. Cl.
*H04L 43/087* (2022.01)
*H04L 45/74* (2022.01)

(56) References Cited

U.S. PATENT DOCUMENTS

| | | |
|---|---|---|
| 2002/0150099 A1 | 10/2002 | Pung et al. |
| 2006/0146720 A1 | 7/2006 | Lee et al. |
| 2012/0002566 A1 | 1/2012 | Inagaki |
| 2017/0359229 A1 | 12/2017 | Dintenfass et al. |

FOREIGN PATENT DOCUMENTS

| | | | |
|---|---|---|---|
| CN | 102739448 | A | 10/2012 |
| CN | 103139070 | A | 6/2013 |
| CN | 103888981 | A | 6/2014 |
| CN | 103957158 | A | 7/2014 |
| CN | 104104603 | A | 10/2014 |
| CN | 105453493 | A | 3/2016 |
| CN | 105812201 | A | 7/2016 |
| CN | 106559280 | A | 4/2017 |
| CN | 107508719 | A | 12/2017 |

\* cited by examiner

PACKET FORWARDING PATH DETERMINING METHOD, DEVICE, AND SYSTEM

CROSS-REFERENCE TO RELATED APPLICATIONS

This application is a continuation of International Application No. PCT/CN2019/091922, filed on Jun. 19, 2019, which claims priority to Chinese Patent Application No. 201811055746.7, filed on Sep. 11, 2018, The disclosures of the aforementioned applications are hereby incorporated by reference in their entireties.

TECHNICAL FIELD

This application relates to the communications field, and in particular, to a packet forwarding path determining method, a device, and a system.

BACKGROUND

A user accesses an Internet resource by using a network. A neighbor is discovered between routers based on a routing protocol, and a routing table is generated and maintained. A device (such as a router or a switch) on a path forwards a packet based on the routing table to complete data interaction between the user and a server.

A conventional routing technology mainly includes an interior gateway protocol (IGP) and a border gateway protocol (BGP). In both of the two protocols, a route is planned based on a shortest path. Currently, commonly used IGP protocols include an OSPF protocol and an intermediate system to intermediate system (IS-IS) protocol. In both of the two protocols, link status information is advertised between adjacent devices. Each router first generates a directed graph of a global network by using the link status information, and then calculates a packet route based on a shortest path first (SPF) algorithm to generate a routing table, so that a packet is forwarded along a shortest path.

However, in the conventional routing technology, the packet route is calculated by using the shortest path, and this may cause unbalanced network load. In addition, with continuous deepening of technologies such as 5G and Internet of things (TOT), the conventional routing technology cannot meet application requirements in various aspects, such as, a high bandwidth, a low delay, and low jitter.

SUMMARY

Embodiments provide a packet forwarding path determining method, a device, and a system, to determine a packet forwarding path that meets link resource indication information.

According to a first aspect, a packet forwarding path determining method is provided, and the method includes:

generating, by a first device, a first measurement packet, where the first measurement packet includes link resource indication information, and the link resource indication information is used to indicate each node on a forwarding path of the first measurement packet to perform local link resource measurement; and sending, by the first device, the first measurement packet.

According to the technical solution provided as in this embodiment, the first measurement packet is sent to next nodes on different forwarding paths until the first measurement packet is sent to a third device, so that the third device determines, based on local link resource information measured by each node and the link resource indication information that are included in the first measurement packet, a packet forwarding path that meets the link resource indication information. In addition, in a path determining process, the local link resource information measured by each node on the forwarding path of the first measurement packet can be obtained without a need of extending a network protocol, thereby relieving burden on a network control plane.

In a possible design, the first measurement packet further includes link resource information of the first device.

In a possible design, the link resource indication information includes at least one of the following information: delay information, bandwidth information, packet loss rate information, and jitter information.

In a possible design, before the generating, by a first device, a first measurement packet, the method further includes:

receiving, by the first device, a forwarding packet, where the forwarding packet is used to trigger the first device to generate the first measurement packet.

In a possible design, the generating, by a first device, a first measurement packet includes:

duplicating, by the first device, a packet header of the received forwarding packet to generate the first measurement packet.

In another possible design, the method further includes:

generating, by the first device, a second measurement packet, where the second measurement packet includes link resource indication information, and the link resource indication information is used to indicate the first device to perform local link resource measurement; and sending, by the first device, the second measurement packet, so that after receiving the second measurement packet, a second device determines whether local link resource information measured by the second device meets the link resource indication information, and when the local link resource information measured by the second device meets the link resource indication information, the second device sends the second measurement packet to a next device on the forwarding path, or when the local link resource information measured by the second device does not meet the link resource indication information, the second device sends a feedback message, thereby implementing real-time monitoring on the packet forwarding path.

In a possible design, the method further includes:

receiving, by the first device, the feedback message; and generating, by the first device, a third measurement packet, where the third measurement packet includes link resource indication information, and the link resource indication information is used to indicate the first device to perform local link resource measurement; where a function of the third measurement packet is the same as that of the first measurement packet, and the third measurement packet is used to determine a path that meets the link resource indication information.

According to a second aspect, a packet forwarding path determining method is provided, and the method includes:

receiving, by a second device, a first measurement packet, where the first measurement packet includes link resource indication information, and the link resource indication information is used to indicate the second device to perform local link resource measurement; measuring, by the second device, local link resource information according to the link resource indication information; and sending, by the second device, the first measurement packet, where the first measurement packet includes the local link resource information measured by the second device.

According to the technical solution provided as in this embodiment, a third device that subsequently receives the first measurement packet determines, based on first measurement packets received from different forwarding paths, a path that meets the link resource indication information, to forward a data packet. In addition, local link resource information of each node on the forwarding path is obtained without a need of extending a network protocol, and the path that meets the link resource indication information is determined, thereby relieving burden on a network control plane.

In a possible design, the link resource indication information includes at least one of the following information: delay information, bandwidth information, packet loss rate information, and jitter information.

In a possible design, the method further includes:
determining, by the second device, whether the local link resource information meets the link resource indication information; and
when the local link resource information does not meet the link resource indication information, sending, by the second device, a feedback message, to implement real-time link monitoring.

In a possible design, before the determining, by the second device, whether the local link resource information meets the link resource indication information, the method further includes:
receiving, by the second device, a second measurement packet, where the second measurement packet includes the link resource indication information.

In another possible design, the method further includes:
when the local link resource information meets the link resource indication information, sending, by the second device, a second measurement packet, where the second measurement packet includes the local link resource information measured by the second device, to monitor a packet forwarding path.

In a possible design, the method further includes:
receiving, by the second device, a third measurement packet, where the third measurement packet includes link resource indication information, and the link resource indication information is used to indicate the second device to perform local link resource measurement, so that the second device measures the local link resource information according to the link resource indication information, and sends the third measurement packet, where the third measurement packet includes the local link resource information measured by the second device until the third measurement packet is sent to the third device, and the third device re-determines a packet forwarding path based on third measurement packets received from different forwarding paths.

According to a third aspect, a packet forwarding path determining method is provided, and the method includes:
receiving, by a third device, a first measurement packet, where the first measurement packet includes link resource indication information and local link resource information measured by each node on a forwarding path of the first measurement packet, and the link resource indication information is used to indicate the third device to perform local link resource measurement;
determining, by the third device, a packet forwarding path according to the link resource indication information and the local link resource information that is measured by each node on the forwarding path of the first measurement packet; and
sending, by the third device, information about the path.

According to the technical solution provided as in this embodiment, a fast channel that meets the link resource indication information may be established, so that a data packet is quickly forwarded. In addition, local link resource information of each node on the forwarding path is obtained without a need of extending a network protocol, and the path that meets the link resource indication information is determined, thereby relieving burden on a network control plane.

In a possible design, the link resource indication information includes at least one of the following information: delay information, bandwidth information, packet loss rate information, and jitter information.

In a possible design, the sending, by the third device, information about the path includes:
sending, by the third device, the information about the path through a control channel or a data channel.

In a possible design, the method further includes:
determining, by the third device, whether the local link resource information meets the link resource indication information; and
when the local link resource information does not meet the link resource indication information, sending, by the third device, a feedback message, to implement real-time link monitoring.

In a possible design, before the determining, by the third device, whether the local link resource information meets the link resource indication information, the method further includes:
receiving, by the third device, a second measurement packet, where the second measurement packet includes link resource indication information, and the link resource indication information is used to indicate the third device to perform local link resource measurement.

In a possible design, the method further includes:
receiving, by the third device, a third measurement packet, where the third measurement packet includes link resource indication information and local link resource information measured by each node on the forwarding path of the first measurement packet, and the link resource indication information is used to indicate the third device to perform local link resource measurement; where a function of the third measurement packet is the same as that of the first measurement packet, and the third measurement packet is used to re-determine a packet forwarding path. A specific determining process of the packet forwarding path is the same as a process of determining the packet forwarding path by using the first measurement packet.

According to a fourth aspect, a first device is provided, and the first device has a function of implementing behavior of the first device in the method in the first aspect. The function may be implemented by using hardware, or may be implemented by executing corresponding software by using hardware. The hardware or software includes one or more modules corresponding to the foregoing function.

According to a fifth aspect, a second device is provided, and the second device has a function of implementing behavior of the second device in the method in the second aspect. The function may be implemented by using hardware, or may be implemented by executing corresponding software by using hardware. The hardware or software includes one or more modules corresponding to the foregoing function.

According to a sixth aspect, a third device is provided, and the third device has a function of implementing behavior of the third device in the method in the third aspect. The function may be implemented by using hardware, or may be implemented by executing corresponding software by using hardware. The hardware or software includes one or more modules corresponding to the foregoing function.

According to a seventh aspect, a device is provided, where the device includes a transmitter, a receiver, a processor, and a memory, the transmitter and the receiver are configured to send and receive data, the memory is configured to store a program, and the processor is configured to execute the program stored in the memory, to control the device to perform the method according to any one of the first aspect or the possible designs of the first aspect.

According to an eighth aspect, a device is provided, where the device includes a transmitter, a receiver, a processor, and a memory, the transmitter and the receiver are configured to send and receive data, the memory is configured to store a program, and the processor is configured to execute the program stored in the memory, to control the device to perform the method according to any one of the second aspect or the possible designs of the second aspect.

According to a ninth aspect, a device is provided, where the device includes a transmitter, a receiver, a processor, and a memory, the transmitter and the receiver are configured to send and receive data, the memory is configured to store a program, and the processor is configured to execute the program stored in the memory, to control the device to perform the method according to any one of the third aspect or the possible designs of the third aspect.

According to a tenth aspect, a system is provided, where the system includes the first device in any one of the seventh aspect or the possible implementations of the seventh aspect, the second device in any one of the eighth aspect or the possible implementations of the eighth aspect, and the third device in any one of the ninth aspect or the possible implementations of the ninth aspect.

According to an eleventh aspect, a computer readable storage medium is provided, and a computer program is stored in the computer readable storage medium. When the computer program is executed by a processor, the method in any one or more of the first aspect to the third aspect is implemented.

According to a twelfth aspect, a computer program product including an instruction is provided. When the instruction runs on a computer, the computer is enabled to perform the method in any one or more of the first aspect to the third aspect.

Embodiments provide a packet forwarding path determining method, a device, and a system. A first device generates a first measurement packet, and sends the first measurement packet to each node on a forwarding path. Each node measures local link resource information according to link resource indication information in the first measurement packet, and sends the first measurement packet, where the first measurement packet includes the local link resource information measured by each node on the forwarding path until the first measurement packet is sent to a third device. When receiving first measurement packets sent from different forwarding paths, the third device determines, based on link resource information included in the first measurement packets, a path that meets the link resource indication information, to forward a packet. In addition, in a packet forwarding path determining process, the local link resource information measured by each node on the forwarding path can be obtained without a need of extending a network protocol, and further a packet forwarding path is determined, thereby relieving burden on a network control plane.

DESCRIPTION OF EMBODIMENTS

Figure 1:
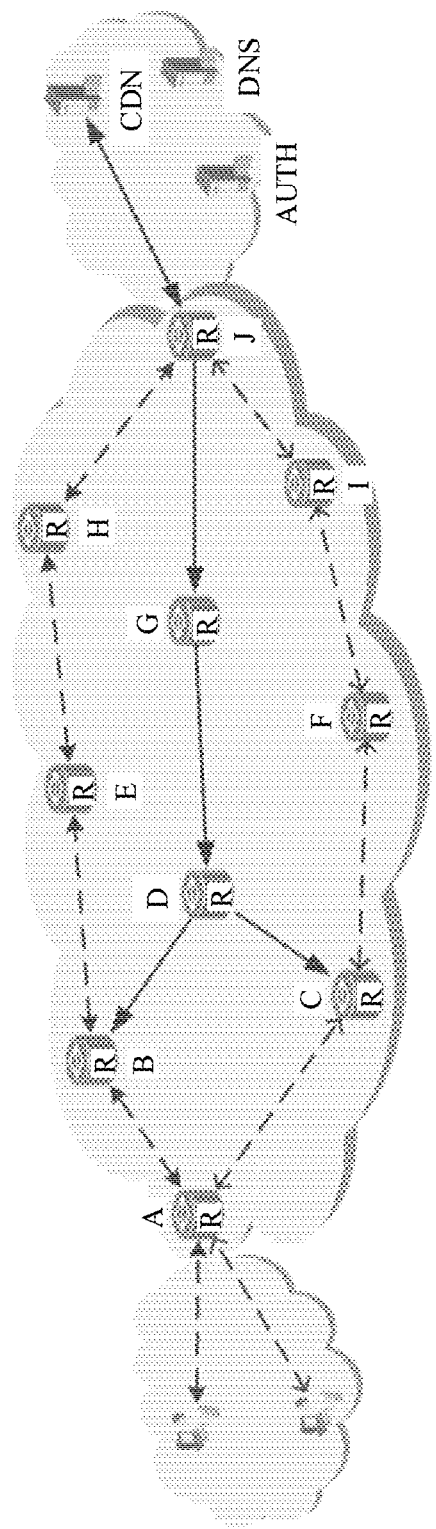
FIG. 1 is a schematic architectural diagram of a system according to one embodiment.

Embodiments provide a packet forwarding path determining method, a device, and a system. When a first device in the system receives a forwarding packet sent by user equipment or a server, the first device duplicates a packet header of the forwarding packet to generate a measurement packet, where the packet header includes a source address of a source device that sends the forwarding packet and a target address of a target device to which the forwarding packet is sent, and the generated measurement packet also includes a source address and a target address. The first device measures local link resource information in real time according to link resource indication information of the forwarding packet, such as bandwidth information, delay information, jitter information, or packet loss rate information, and writes the measured local link resource information to the measurement packet. The first device queries a routing table based on the target address in the measurement packet, determines a next device on a path that can reach the target device, and sends the measurement packet to the next device. There may be a plurality of paths that can reach the target device. The next device that receives the measurement packet performs a same operation as that performed by the first device after generating the measurement packet: measuring local link resource information, writing the local link resource information to the measurement packet, querying the routing table based on the target address in the measurement packet, determining a next device on at least one path that can reach the target device, and sending the measurement packet to a next device on a corresponding path until the measurement packet is sent to a third device. The third device is a last device through which the measurement packet passes before being sent to the target device. After receiving the measurement packet, the third device counts a collected path, determines, according to the link resource indication information of the forwarding packet and local link resource information measured by each device on a forwarding path, a path that meets the link resource indication information of the forwarding packet, and sends information about the determined path to the first device or a device on the path, where the device on the path includes the first device, to complete sending of the forwarding packet. This relieves burden on a controller in a centralized control mode.

In some embodiments, the first device may be referred to as an ingress device, or may be referred to as an initial device, and the third device may be referred to as an egress device. A device through which the measurement packet passes from the first device to the third device is referred to as the second device, and may also be referred to as a transmit device.

In some embodiments, when a user terminal accesses the server by using a network, a service provider provides different services for different users. In other words, the service provider sets different link resource indication information based on different forwarding packets, to meet a requirement of the server when the server sends content requested by the user terminal to the user terminal.

FIG. 1 is a diagram of a system architecture according to one embodiment. As shown in FIG. 1, when a terminal of a user accesses a content delivery network (CDN) server (such as Youku or Tencent) by using a network, devices such as a switch and a router are passed through on a path. A CDN service provider needs to provide different services for different users. When a VIP user accesses a live video on Youku, Youku needs to ensure a video play delay. When sending video data, the CDN server puts forward a delay requirement to a first device (a device J in FIG. 1). When forwarding the video data, the device J generates a measurement packet, measures local link resource information of a plurality of reachable paths in real time, writes the local link resource information to the measurement packet, and queries a routing table based on a target address to determine a next device H/device I/device G on the reachable path. Then, the device H/device I/device G that receives the measurement packet writes, to the measurement packet, local link resource information measured by the device H/device I/device G in real time, queries a next device E/device F/device D on the reachable path based on the target address, and sends the measurement packet until the measurement packet is sent to a third device, namely, a device A. In this case, the device A collects a path J-H-E-B-A, a path J-I-F-C-A, a path J-G-D-B-A, and a path J-G-D-C-A, and local link resource information measured by each device on each path, and the device A plans, from the four paths, a path that meets a requirement, and sends the path to the device J, so that the device J transmits the video data based on the planned path.

The following describes some embodiments in accordance with the disclosure with reference to the accompanying drawings. It should be noted that a "link" and a "path" mentioned in the embodiments represent a same meaning. In addition, in the embodiments, "first", "second", and "third" are used to distinguish between objects, and do not limit the objects. A "forwarding packet" mentioned in the embodiments may also be referred to as a "packet". In the embodiments, a forwarding packet may be a data packet.

Figure 2:
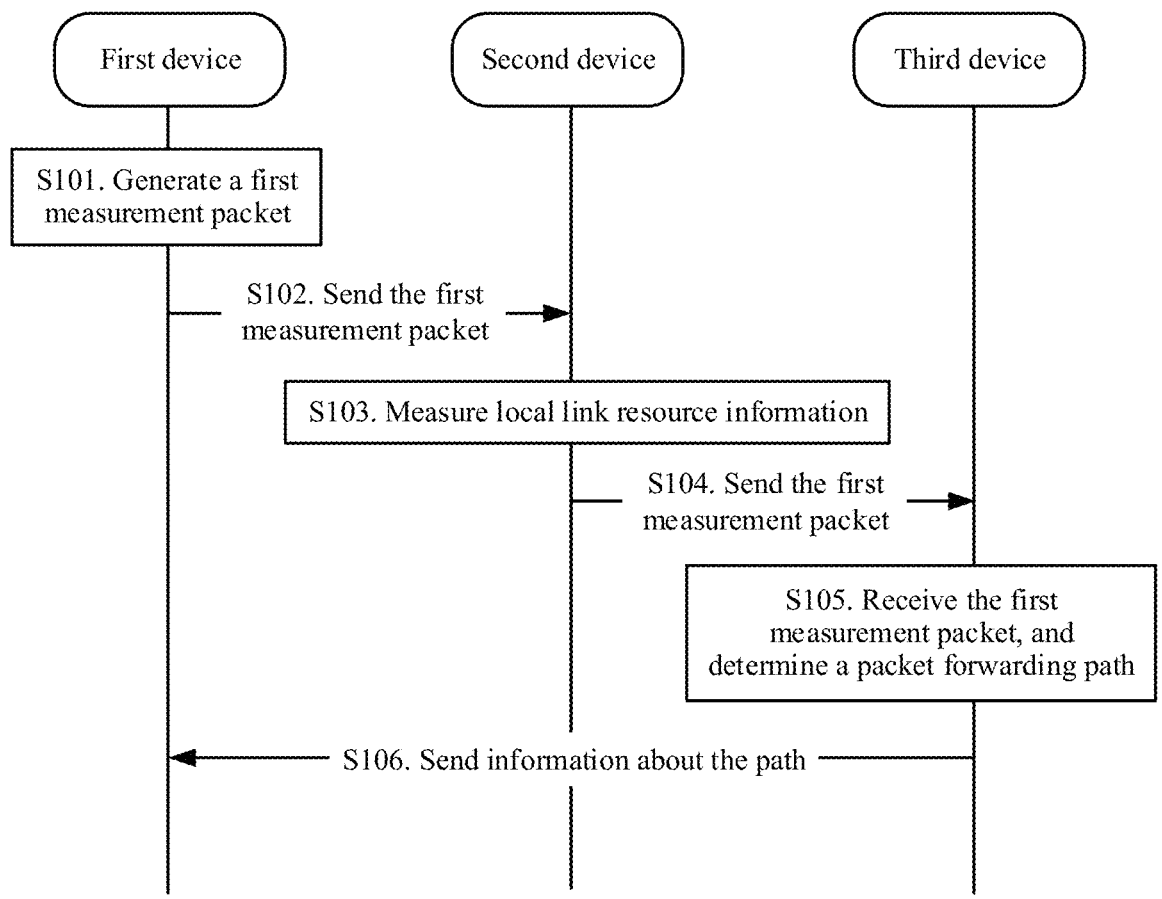
FIG. 2 is a schematic flowchart of a packet forwarding path determining method according to one embodiment.

FIG. 2 is a schematic flowchart of a packet forwarding path determining method according to one embodiment. As shown in FIG. 2, the method may include the following steps.

S101. A first device generates a first measurement packet.

The first measurement packet includes link resource indication information, and the link resource indication information is used to indicate each node on a forwarding path of the first measurement packet to perform local link resource measurement. In other words, the first measurement packet is used by each node on the forwarding path to measure a local link resource according to the link resource indication information, to obtain local link resource information.

Each node is each device on a path for forwarding the first measurement packet. The local link resource information is link resource information obtained by each node by measuring a local link resource of each node, for example, link resource information such as a bandwidth of the current node.

In some embodiments, as in this embodiment, the first device receives a forwarding packet sent by user equipment or a server. When the first device receives the forwarding packet, the first device is triggered to generate the first measurement packet. As in this embodiment, the forwarding packet received by the first device may also be referred to as a packet. The forwarding packet herein may be a data packet, or may be another triggering packet.

For example, a specific process of generating the first measurement packet by the first device may be as follows: When the first device receives the data packet, the first device duplicates a packet header of the data packet to generate the first measurement packet.

The data packet includes a source address and a target address, the source address is an address corresponding to a source device that sends the data packet, and the target address is an address corresponding to a target device to which the data packet is sent. The first measurement packet includes the target address and the link resource indication information. The link resource indication information is requirement information that needs to be met by a link for sending the data packet, for example, requirement information such as delay information, bandwidth information, packet loss rate information, or jitter information.

S102. The first device sends the first measurement packet.

The first measurement packet includes the local link resource information measured by the first device according to the link resource indication information. In some embodiments, the link resource indication information may include at least one of delay information, bandwidth information, packet loss rate information, and jitter information. The jitter information is jitter, and may also be referred to as a jitter rate, and is a variation of a network delay. The jitter information is generated when any two adjacent data packets of a same application undergo a network delay on a transmission route. The jitter rate may be obtained by dividing a delay time difference of adjacent data packets by a sequence number difference of the data packets.

The first device may send the first measurement packet to a next device on the forwarding path of the first measurement packet. As in this embodiment, the next device to which the first device sends the first measurement packet may be referred to as a second device.

In some embodiments, as in this embodiment, the first device may send the first measurement packet to second devices on different forwarding paths.

S103. The second device measures local link resource information according to the link resource indication information in the received first measurement packet.

When receiving the first measurement packet sent by the first device, the second device measures the local link resource information according to the link resource indication information in the first measurement packet, and writes the measured local link resource information to the first measurement packet.

In some embodiments, as in this embodiment, the link resource indication information may be at least one piece of link resource indication information such as delay information, bandwidth information, packet loss rate information, and jitter information of the forwarding packet.

For example, the link resource indication information is bandwidth information. When receiving the first measurement packet, the second device measures corresponding bandwidth information such as a maximum reservable bandwidth or a remaining bandwidth on a local link, and writes the measured corresponding bandwidth information such as the maximum reservable bandwidth or the remaining bandwidth on the local link to the first measurement packet.

S104. The second device sends the first measurement packet.

The second device sends the first measurement packet to a next device on the forwarding path, and then the next device performs same processing as the second device until the first measurement packet is sent to a previous device of the target device. As in this embodiment, the previous device of the target device is referred to as a third device.

As in this embodiment, a forwarding path from the first device to the third device may include one or more second devices.

S105. The third device determines a packet forwarding path based on the received first measurement packet.

The third device receives first measurement packets forwarded from different paths, in other words, the third device receives at least one first measurement packet. It may be understood that each first measurement packet in the at least one first measurement packet includes a local link resource measured by each device on the forwarding path of the first measurement packet according to the link resource indication information.

The third device determines the packet forwarding path according to the link resource indication information in the received first measurement packet and the local link resource information that is included in each of the at least one first measurement packet and that is measured by each device. The link resource indication information is used to indicate the third device to perform local link resource measurement, and the link resource indication information is further used to indicate required link resource information, for example, a bandwidth of 500 M is required to forward the data packet, or a delay of 50 ms is required to forward the data packet. For example, the third device compares, according to the link resource indication information, local link resource information in a first measurement packet received on each forwarding path, to determine a path that meets the link resource indication information.

For example, the link resource indication information is bandwidth information. It is assumed that a packet forwarding link needs to ensure a bandwidth of 300 M. The third device is a device F, and the device F receives two first measurement packets from a forwarding path "device A-device C-device F" and a forwarding path "device A-device D-device F". The first measurement packets carry local link resource information measured by the device A, the device C, and the device D. On the forwarding path "device A-device C-device F", a remaining bandwidth from the device A to the device C that is measured by the device A is 500 M, and a remaining bandwidth from the device C to the device F that is measured by the device C is also 500 M. On the forwarding path "device A-device D-device F", a remaining bandwidth from the device A to the device D that is measured by the device A is 500 M, and a remaining bandwidth from the device D to the device F that is measured by the device D is 200 M. In this case, the device F compares a remaining bandwidth measured by each node on the two forwarding paths with the bandwidth of 300 M that needs to be ensured by the packet forwarding link. It may be learned that a bandwidth of the forwarding path "device A-device C-device F" meets a bandwidth requirement of the packet forwarding link. In this embodiment, the device F determines that the forwarding path "device A-device C-device F" is used as the packet forwarding path.

S106. The third device sends information about the path.

The third device sends the information about the path to the first device, or at least one second device and the first device on the path.

In some embodiments, in an embodiment, the sending, by the third device, information about the path includes:

sending, by the third device, the information about the path to the first device or each device on the path through a control channel, where the control channel is a dedicated channel established between the first device, the at least one second device, and the third device, and the dedicated channel may be used for information configuration.

In some embodiments, in another embodiment, the sending, by the third device, information about the path includes the following:

The third device sends the information about the path to the first device or each device on the path through a data channel. For example, along the determined path, the information about the path is sent to each device on the path, so that the first device establishes a fast forwarding tunnel, to facilitate subsequent fast forwarding of the data packet. As in this embodiment, in a process of establishing the fast forwarding tunnel, a type of the fast forwarding tunnel is a current network forwarding type based on a network, for example, based on a segment routing (segment routing, SR) technology or a multi-protocol label switching (multi-protocol label switching, MPLS) technology.

According to the technical solution as in this embodiment, network burden is relieved.

Figure 3:
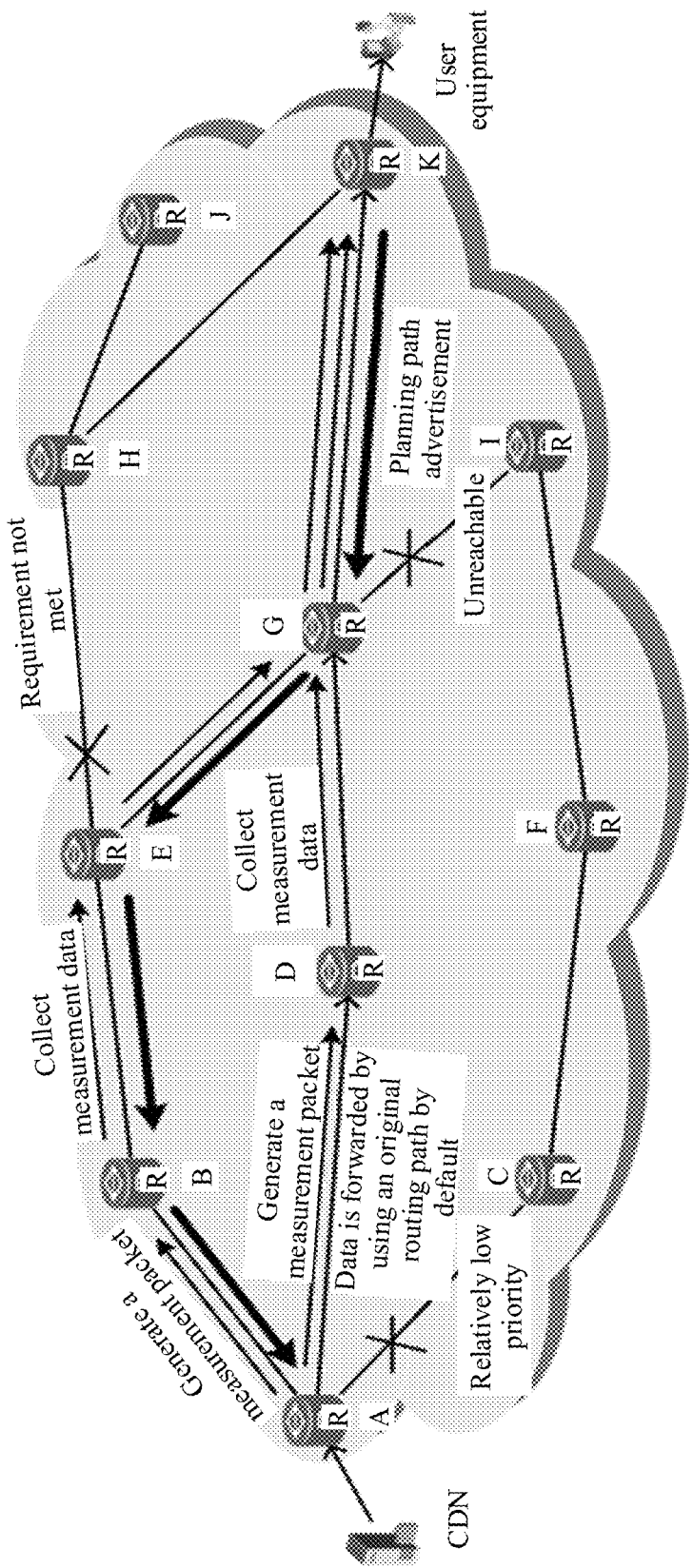
FIG. 3 is a schematic flowchart of a packet forwarding path determining method based on real-time measurement according to one embodiment.

For example, as shown in FIG. 3, a node A is a first device, a node K is a third device, and a node B, a node E, a node G, and a node D on a forwarding path A-B-E-G-K and a forwarding path A-D-G-K from the node A to the node K are all referred to as second devices. After generating a measurement packet, the node A writes measured local link resource information to the measurement packet, queries a routing table based on a target address to determine the next node B and node D on a plurality of links, duplicates the measurement packet, and separately sends the measurement packet to the node B and the node D. After receiving the measurement packet, the node B and the node D separately write respectively measured local link resource information to the measurement packet, and query the routing table based on the target address to determine a next-hop node. The node B determines the node E, and the node D determines the node G. The node B sends the measurement packet to the node E, and the node D sends the measurement packet to the node G until the foregoing two measurement packets are sent to the node K. After receiving the measurement packets, the node K determines, according to link resource indication information of a forwarding packet, to forward the packet by using the link A-B-E-G-K or the link A-D-G-K. It is assumed that the node K determines to forward the packet by using the link A-B-E-G-K, and the node K sends information about the link A-B-E-G-K to the node A, or the node K sends information about the link A-B-E-G-K to a node on the link, in other words, sends the information to the node G, the node D, and the node A.

As in this embodiment, the node A, the node B, the node D, the node E, and the node G may determine, according to a specific rule, a next device for forwarding the measurement packet. As in this embodiment, the routing table may be queried based on the target address to determine a next device on different forwarding paths that can reach a target device. This rule may be customized based on a requirement. For example, in a complex network, there are countless forwarding paths that can reach the target device. To avoid excessive measurement packets in the network, during selection of the next device for forwarding the measurement packet, only a next device on an equal-cost multi-path routing (equal-cost multi-path routing, ECMP) link may be selected, or next devices on first few links with a relatively high priority may be selected. A specific rule is not limited as in this embodiment.

Figure 4:
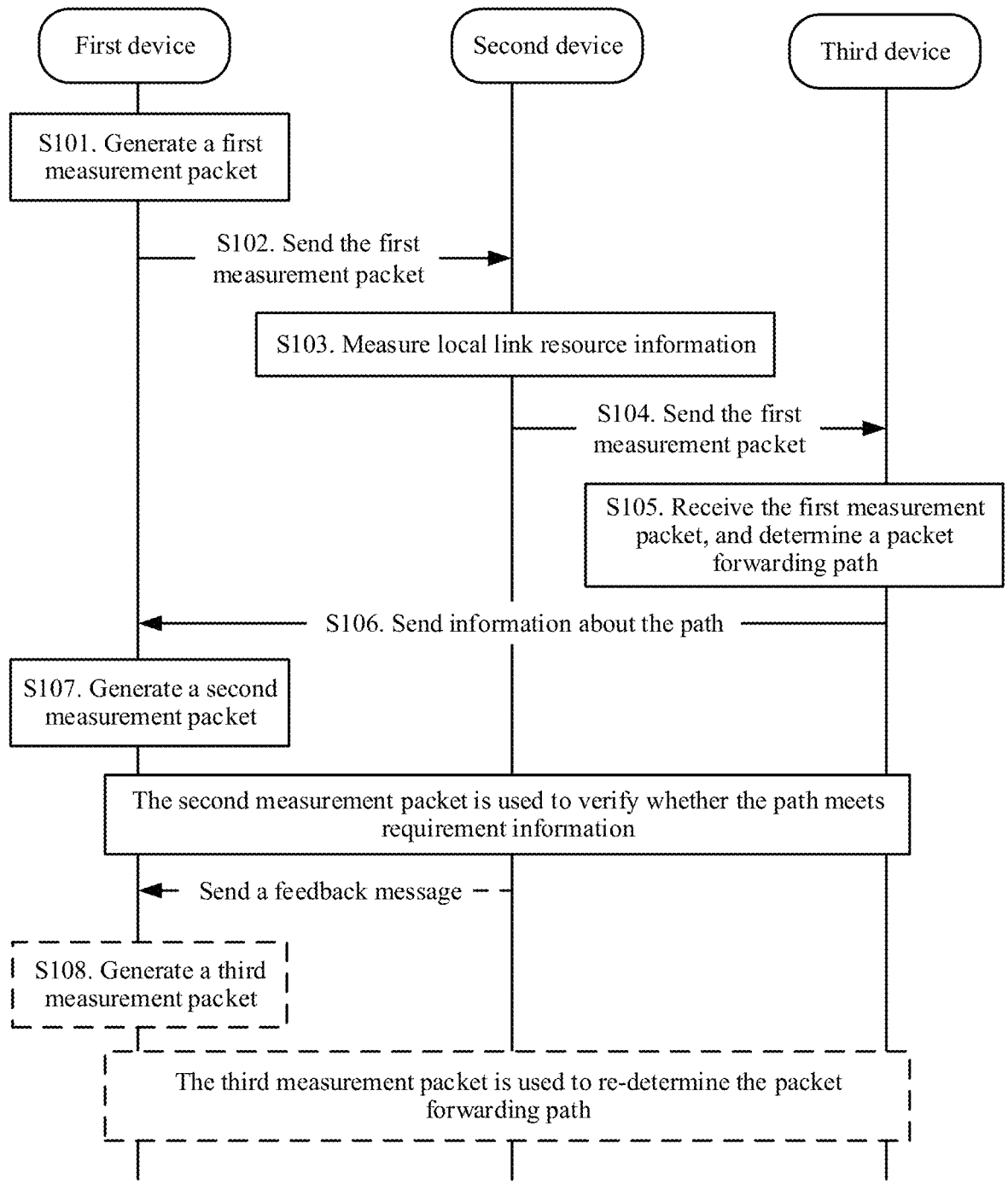
FIG. 4 is a schematic flowchart of another packet forwarding path determining method according to one embodiment.

In some embodiments, in an embodiment of this application, as shown in FIG. 4, the method may further include the following step.

S107. The first device generates a second measurement packet.

After determining the packet forwarding path based on the steps in FIG. 2, the first device generates the second measurement packet at definite time or periodically generates the second measurement packet. The second measurement packet includes link resource indication information that is used to indicate the first device to perform local link resource measurement. The first device generates the second measurement packet, measures local link resource information, and writes the link resource information to the second measurement packet. Due to a network resource situation, in this case, the local link resource information measured by the first device may be different from the local link resource information measured by the first device when the first device generates the first measurement packet. In other words, the local link resource information that is measured by the first device and that is included in the second measurement packet may be different from the local link resource information that is measured by the first device and that is included in the first measurement packet.

The link resource indication information in the second measurement packet is used to indicate each node on the path determined in the steps in FIG. 2 to measure local link resource information, and determine whether the local link resource information meets the link resource indication information. In other words, the second measurement packet is used to detect whether a path determined by using the first measurement packet meets the link resource indication information of the forwarding packet. The second measurement packet is forwarded by devices on the determined path one by one. In a forwarding process, if any device on the path determines that the path does not meet the link resource indication information of the forwarding packet, S108 is performed.

S108. The first device receives a feedback message sent by the second device or the third device, and generates a third measurement packet.

When determining that local link resource information does not meet the link resource indication information, any device on the path sends a feedback message to the first device. The first device receives the feedback message, and generates the third measurement packet. The third measurement packet also includes link resource indication information and local link resource information that is measured and written when the first device generates the third measurement packet. The third measurement packet is used to re-determine a packet forwarding path. A process of re-determining the packet forwarding path is similar to a process of steps S101 to S106 in FIG. 2. For brief descriptions, details are not described herein again.

In some embodiments, as in this embodiment, the method further includes:

when the first device receives the data packet, the first device queries, based on the target address, whether a fast forwarding tunnel for forwarding the data packet has been established.

When the fast forwarding tunnel for forwarding the data packet has been established, the data packet is sent by using the established fast forwarding tunnel.

When the fast forwarding tunnel for sending the data packet has not been established, the first device determines, based on the data packet that needs to be sent, whether to establish the fast forwarding tunnel for sending the data packet. There may be a correspondence between a type of the data packet that needs to be sent and the link resource indication information. For example, link resource indication information corresponding to a data packet of video broadcasting is delay information, and link resource indication information corresponding to a data packet transmitted by using big data is bandwidth information. For example, if a VIP client accesses a live video of a video website, a play delay of video play needs to be ensured. In this case, link resource indication information is delay information, and a fast forwarding tunnel for a forwarding packet needs to be established based on the delay information.

Certainly, in an embodiment, if the data packet is a common service, the forwarding packet does not include the link resource indication information, the fast forwarding tunnel does not need to be established, and the data packet may be forwarded by using a default link.

In a process of establishing the fast forwarding tunnel, the first device obtains a packet header of the data packet to generate the first measurement packet. A subsequent execution process is the same as steps S101 to S106 in FIG. 2. For brief descriptions, details are not described herein again.

It should be noted that, as in this embodiment, at a same time of determining the packet forwarding path by using the measurement packet, the forwarding packet is sent to the target device by using the default link.

In some embodiments, as in this embodiment, the link resource indication information may be at least one piece of link resource indication information such as delay information, bandwidth information, packet loss rate information, and jitter information of the forwarding packet.

For example, as in this embodiment, the link resource indication information is delay information, in other words, the forwarding packet has a delay requirement. This embodiment describes a method for determining a path with a delay requirement based on in-band operations, administration, and maintenance (in-band operations, administration, and maintenance, iOAM) in an ECMP/SR scenario.

Figure 5:
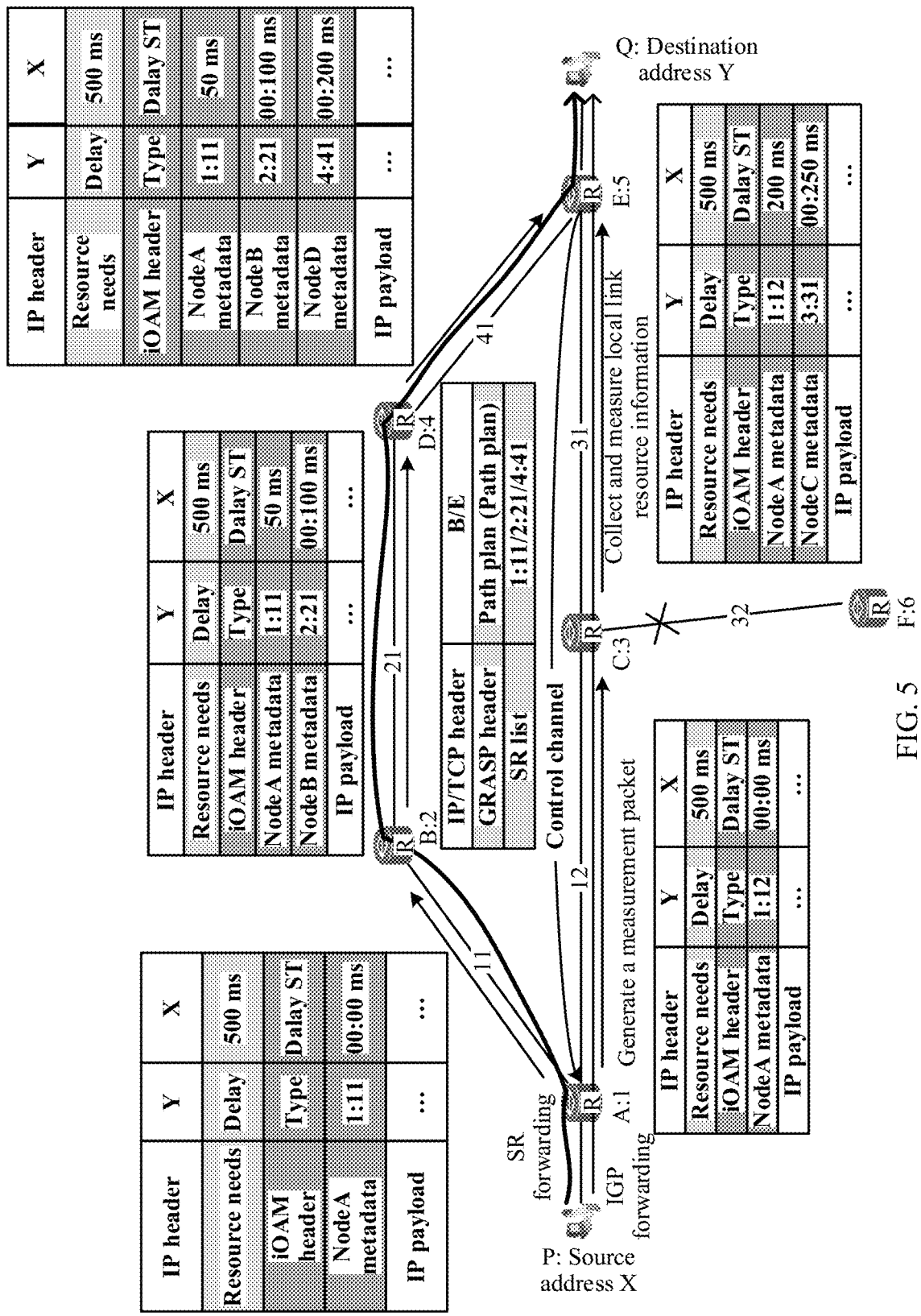
FIG. 5 is a schematic diagram of planning a network with a delay requirement based on iOAM according to one embodiment.

As shown in FIG. 5, it is assumed that a delay between a node P and a node Q needs to be within 500 ms. Forwarding is performed in a forwarding network based on an SR tunnel, a node SID and an adjacency (adjacency) SID have been allocated between devices by using an interior gateway protocol (IGP) (for example, a node SID of a node A in the figure is 1, and adjacency SIDs are 11 and 12), and iOAM is extended to collect a link resource along a path, and advertise a planned path by using an autonomic control plane (ACP) control channel that is based on an autonomic networking integrated model approach (ANIMA).

In FIG. 5, the node A is referred to as an ingress device, and may also be referred to as a first device; a node E is referred to as an egress device, and may also be referred to as a third device; and a node on a path from the node A to the node E is referred to as a transmit device, and may also be referred to as a second device.

When the ingress device receives a data packet sent by the node P, the ingress device duplicates a packet header of the data packet to generate a measurement packet. The packet header includes an IP header of the packet, a source address X of a source device P (namely, the node P) that sends the data packet, and a target address Y of a target device Q to which the packet is sent. The measurement packet includes the IP header, resource needs information (resource needs), an iOAM header, node metadata, and the like. The resource needs information is link resource indication information, that is, delay information of 500 ms required for sending the data packet.

The ingress device generates the measurement packet, measures local link resource information, and writes the measured local link resource information to the measurement packet. A type of the measured local link resource information written to an iOAM extension header of the measurement packet is delay statistics, where statistics is written as ST for short. Information such as a node SID, an adjacency SID, and a packet sending time stamp is written to the node metadata, such as local link resource information that is of a forwarding path node A-node B and that is measured by the node A. The node SID is 1, and the adjacency SID is 11. It is assumed that the packet sending time stamp is 00 ms, and there is no delay. In this case, the node metadata written to the measurement packet is NodeA metadata: 1:11, 00:00 ms, as shown in FIG. 5. After the local link resource information is written to the measurement packet and is encapsulated, the ingress device queries a routing table based on the target address Y, selects a next device (namely, a transmit device) on a plurality of paths that can reach the target address Y, and duplicates and sends the measurement packet. As in this embodiment, transmit devices: the node B and the node C may be separately selected based on an ECMP link selection method, and the measurement packet is sent to the node B and the node C.

After receiving the measurement packet, the node B and the node C measure local link resource information, for example, information such as a period of time for receiving the measurement packet from each forwarding path, and write, to the measurement packet, respective local link resources measured in real time. For example, the local link resource information measured by the node B is a period of time (for example, 50 ms) for receiving the measurement packet. The local link resource information is written to the measurement packet, and the period of time for receiving the measurement packet is written. Compared with time 00 ms at which the node A sends the packet, a delay is 50 ms, in other words, the local link resource information written by the node B to the measurement packet is a delay of 50 ms in NodeA metadata. Time is required when the node B receives the measurement packet, measures the local link resource information, writes the local link resource information to the measurement packet, and encapsulates the measurement packet. It is assumed that these operations require 50 ms. It is ideally considered that the node B sends the measurement packet to a next device (for example, the node D) within 100 ms, a node SID of the node B is 2, and an adjacency SID from the node B to the node D is 21. In this case, the node B writes NodeB metadata: 2:21, 00:100 ms to the measurement packet. It should be noted that, in this embodiment, it is assumed that 50 ms is required when each node measures local link resource information, writes the local link resource information to the measurement packet, and encapsulates the measurement packet.

The node B and the node C write measured local link resource information to the measurement packet, query the routing table based on the target address Y, select a next device on a plurality of paths that can reach the target address Y, and duplicate and forward the packet until the measurement packet is sent to the node E, namely, the egress device. In FIG. 5, a next device selected by the node B is the node D, and a next device selected by the node C is the node E. In this embodiment, after receiving the measurement packet, the transmit device calculates a link delay based on a period of time for receiving the measurement packet and an existing measurement packet sending time stamp of a previous device in the measurement packet, to determine whether a delay does not exceed a required delay of 500 ms. For example, after receiving the measurement packet, the node B calculates a link delay of 50 ms based on the period of time (such as 50 ms) for receiving the measurement packet and an existing measurement packet sending time stamp 0 ms of the node A in the measurement packet, to determine whether the delay requirement of 500 ms is exceeded. In this embodiment, when the delay of 50 ms of the node B does not exceed 500 ms, the node B writes, to the measurement packet, the local link resource information measured in real time: an A/B link delay, a local node SID, an adjacency SID, a packet sending time stamp, and the like, and sends the measurement packet to the node D. Similarly, after receiving the measurement packet, the same as receiving the measurement packet by the node B, the node C performs same calculation processing: calculating and determining a delay, and querying a next device based on the target address. In this case, when finding that the node F cannot reach the node Y, the node C sends the measurement packet only to the node E.

The egress device receives the measurement packet, summarizes local link resource information that is carried in the measurement packet and that is measured by each node on a link A-B-D-E and a link A-C-E, and determines, from the two links, a path that meets a delay requirement of a user. Specifically, the egress device (namely, the node E) receives the measurement packet sent by the node D. As shown in FIG. 5, in the measurement packet sent by the node D to the node E, NodeD metadata is 4:41, 00:200 ms, in other words, a sending time stamp when the node D sends the measurement packet to the node E is 200 ms. Herein, it is assumed that 50 ms is consumed when the node D sends the measurement packet to the node E. In this case, a time stamp of receiving, by the node E, the measurement packet sent by the node D is 250 ms. Similarly, it is assumed that 50 ms needs to be consumed when the node C sends the measurement packet to the node E. In this case, a time stamp of receiving, by the node E, the measurement packet sent by the node C is 300 ms. The node E compares delays of the two links (a link 1 is A-B-D-E, and a link 2 is A-C-E), and finds that the delay of the link 1 is lower, in other words, 250 ms<300 ms. Therefore, the link 1 is selected as a fast data packet forwarding link. In an embodiment, the egress device advertises a planned path to the ingress device within a control channel. The control channel may be an ACP control channel defined based on an ANIMA working group. As shown in FIG. 5, one control channel is drawn: a control channel from the node E to the node A.

After receiving information that is about the planned link and that is sent by the egress device, the ingress device establishes a fast forwarding tunnel and forwards a packet based on SR. Subsequently, the ingress device may periodically generate and send a measurement packet to detect whether the link meets the delay requirement. When the link does not meet the delay requirement, the ingress device re-generates a measurement packet and re-plans a packet forwarding path.

As in this embodiment, a network device (for example, a device on each path from the node A to the node E) completes real-time measurement and collection of delay information based on iOAM. Each device participates in path decision, and plans, in a distributive manner, a path that is based on the delay requirement.

As in this embodiment, through distributed path decision, burden on a controller in a centralized control mode is greatly relieved. As in this embodiment, an IGP does not need to be extended to collect link delay information, and the delay information can be measured in real time and collected on a data plane based on an iOAM packet, and a path can be planned based on the delay requirement, thereby relieving burden on a control plane.

For example, as in this embodiment, the link resource indication information is bandwidth information, in other words, the forwarding packet has a bandwidth requirement. This embodiment describes a method for determining a path with a bandwidth requirement in an MPLS scenario.

Figure 6:
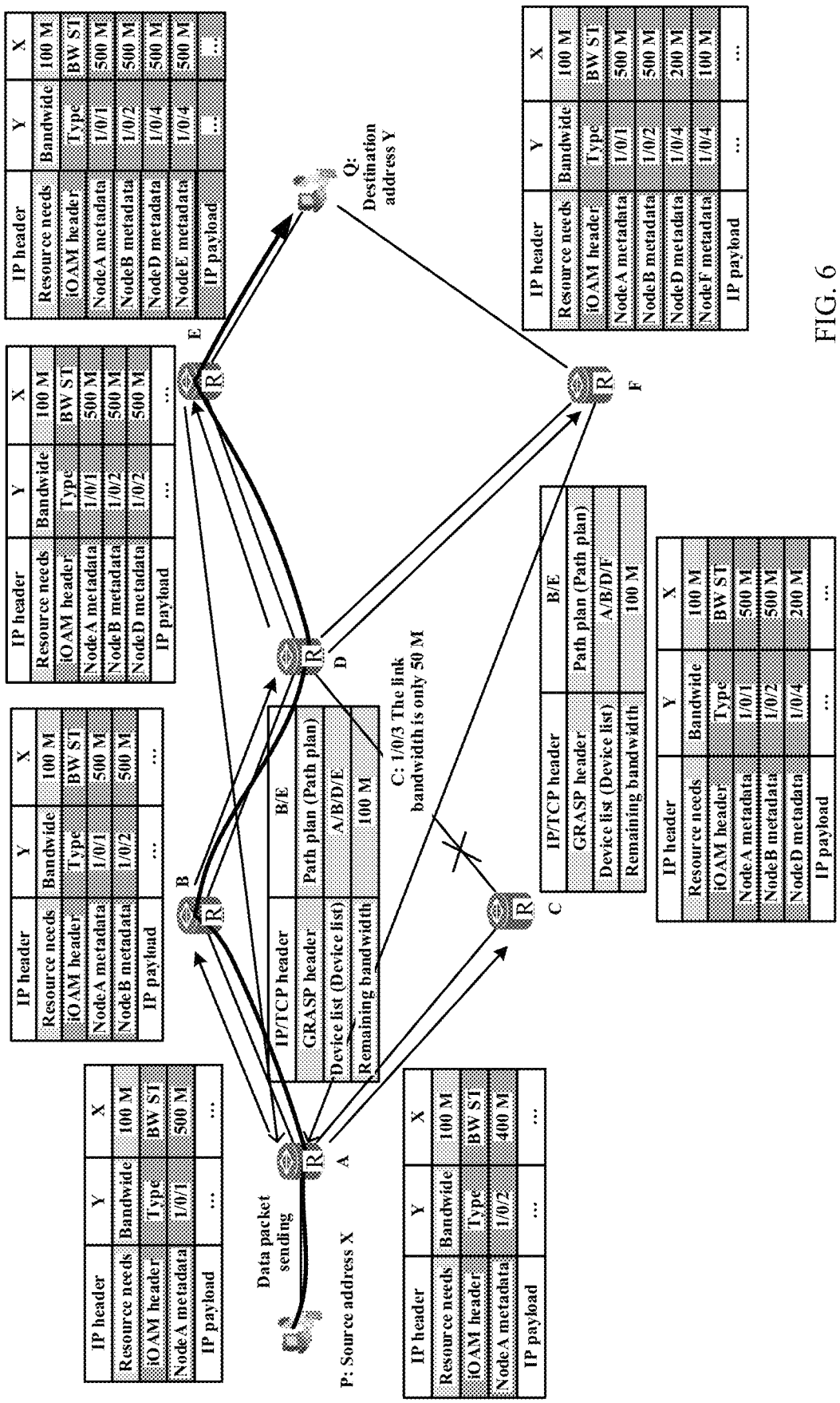
FIG. 6 is a schematic diagram of planning a network with a bandwidth requirement based on iOAM according to one embodiment.

As shown in FIG. 6, it is assumed that a bandwidth between a node P and a node Q needs to be greater than or equal to 100 Mbps, and a forwarding network performs forwarding based on an MPLS tunnel, and iOAM is extended to collect a link resource on a path, and advertise a planned path by using an ANIMA-based ACP control channel.

In FIG. 6, a node A is referred to as an ingress node, a node E and a node F are separately referred to as egress devices, and a node B, a node C, and a node D on a path from the node A to the node E or from the node A to the node F are referred to as transmit devices.

When the ingress device receives a data packet sent by the node P, the ingress device duplicates a packet header of the data packet to generate a measurement packet. The packet header includes an IP header of the packet, a source address X of a source device P that sends the packet, and a target address Y of a target device Q to which the packet is sent. The measurement packet includes an IP header, resource needs information (resource needs), an iOAM header, and node metadata.

The ingress device generates the measurement packet, measures local link resource information, and writes the measured local link resource information to the measurement packet. The local link resource information may include a device address, a maximum reservable bandwidth, a remaining bandwidth, or the like. In this embodiment, the remaining bandwidth is used as an example of the local link resource information for description. As shown in FIG. 6, the ingress device, namely, the node A, writes a type of the measured local link resource information into an iOAM extension header of the measurement packet. In this embodiment, the type of the measured local link resource information is bandwidth statistics, where the band wide statistics is written as BW ST for short. NodeA metadata: 1/0/1, 500 M is written to node metadata. Herein, 1/0/1 is a name of an interface between the node A and the node B, and 500 M is a remaining bandwidth of the node A.

After writing the local link resource information to the measurement packet and completing encapsulation, the node A queries a routing table based on the target address Y, selects a next device (namely, a transmit device) on a plurality of paths that can reach the target address Y, and sends the measurement packet. As shown in FIG. 6, transmit devices selected by the node A are the node B and the node C.

After receiving the measurement packet, the transmit devices write, to the measurement packet, respective local link resources measured in real time. For example, the node B writes a measured local link resource to the measurement packet. Specifically, NodeB metadata: 1/0/2, 500 M is written. Herein, 1/0/2 is a name of an interface between the node B and the node D, and 500 M is a remaining bandwidth of the node B. The transmit devices query the routing table based on the target address Y, select a next device on a plurality of paths that can reach the target address Y, and forward the measurement packet until the measurement packet is sent to the node E or the node F, namely, the egress device.

In this embodiment, after the node B and the node C receive the measurement packet, the node B and the node C separately write measured local link resource information, namely, a name of an interface between devices and a remaining bandwidth, to the measurement packet, and send the measurement packet to a next transmit device. In this embodiment, on a path from the node C to the node D, a remaining bandwidth of the node C is only 50 M, and a bandwidth requirement of 100 M for sending the data packet is not met. Therefore, the path from the node C to the node D is not available. On a path from the node B to the node D, a remaining bandwidth of the node B is 500 M, and the requirement of 100 M for sending the data packet is met. Therefore, the node B sends the measurement packet to the node D. The node D receives the measurement packet sent by the node B, writes a name of an interface between devices and a remaining bandwidth to the measurement packet, and separately sends the measurement packet to the node E and the node F.

When receiving the measurement packet, and determining that a received remaining bandwidth of a link meets the bandwidth requirement of 100 M for sending the data packet, the node E, namely, the egress device determines this link is a link for quickly forwarding the data packet. For example, the node E receives the measurement packet sent by the node D, and determines that a remaining bandwidth from the node D to the node E is 500 M, and a remaining bandwidth from the node E to the node Q is 500 M. 500 M is greater than 100 M. Therefore, the node E determines the link 1: A-B-D-E as a fast packet forwarding link. The node E may advertise information about the link 1 to the ingress node (namely, the node A), the node B, and the node D within a control channel. The control channel may be an ACP control channel defined based on an ANIMA working group.

Similarly, the node F receives the measurement packet, and determines that a remaining bandwidth of the node D in the measurement packet sent by the node D is 200 M. On this link, a remaining bandwidth from the node E to the node Q is equal to 100 M. Therefore, the link 2: A-B-D-F is also used as a fast packet forwarding link, and information about the link 2 is sent to the node A, the node B, and the node D.

The node A receives the information about the link 1 and the information about the link 2, selects one path from the two paths as a link for quickly sending the data packet, initiates bandwidth resource reservation and label allocation (for example, a resource reservation protocol (RSVP)), and forwards the data packet based on MPLS.

It should be noted that, for example, in FIG. 6, a fast packet forwarding link may be a link P-A-B-D-E-Q.

As in this embodiment, a network device (for example, a device on each path from the node A to the node E or the node F) completes real-time bandwidth information collection based on iOAM. Each device participates in path decision, and plans, in a distributive manner, a path that is based on the bandwidth requirement.

As in this embodiment, through distributed path decision, burden on a controller in a centralized control mode is greatly relieved. As in this embodiment, an IGP does not need to be extended to collect link bandwidth information, and the bandwidth information can be collected on a data plane based on an iOAM packet, and a path can be planned based on the bandwidth requirement, thereby relieving burden on a control plane.

The foregoing describes the packet forwarding path determining method. The following describes the device provided in some embodiments in accordance with the disclosure with reference to FIG. 7 to FIG. 12.

Figure 7:
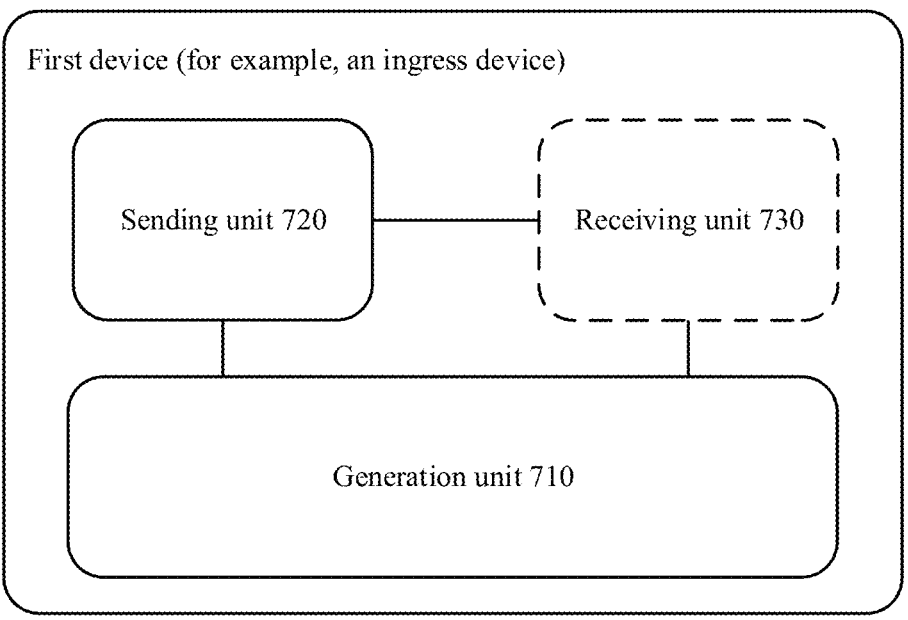
FIG. 7 is a schematic structural diagram of a device according to one embodiment.

FIG. 7 shows the device provided in the embodiments. The device may be the ingress device described in FIG. 1 to FIG. 6, that is, the first device.

As shown in FIG. 7, the device may include a generation unit 710 and a sending unit 720.

The generation unit 710 is configured to generate a first measurement packet, where the first measurement packet includes link resource indication information, and the link resource indication information is used to indicate each node on a forwarding path of the first measurement packet to perform local link resource measurement.

The sending unit 720 is configured to send the first measurement packet.

The sending unit 720 sends the first measurement packet to next nodes on different forwarding paths until the first measurement packet is sent to a third device, so that the third device determines, based on local link resource information measured by each node on the forwarding path and the link resource indication information that are included in the first measurement packet, a packet forwarding path that meets the link resource indication information. In addition, in a path determining process, the local link resource information measured by each node on the forwarding path of the first measurement packet can be obtained without a need of extending a network protocol, thereby relieving burden on a network control plane.

In some embodiments, the first measurement packet further includes link resource information of the first device.

In some embodiments, the link resource indication information includes at least one of the following information: delay information, bandwidth information, packet loss rate information, jitter information, and the like.

In some embodiments, in an embodiment, the device further includes a receiving unit 730. Before the first device generates the first measurement packet, the receiving unit 730 is configured to receive a forwarding packet, where the forwarding packet is used to trigger the first device to generate the first measurement packet.

In some embodiments, that the generation unit 710 generates the first measurement packet includes: the generation unit 710 replicates a packet header of the forwarding packet to generate the first measurement packet.

In some embodiments, the generation unit 710 is further configured to generate a second measurement packet, where the second measurement packet includes link resource indication information; and send, by the first device, the second measurement packet. Therefore, after receiving the second measurement packet, a second device determines whether local link resource information measured by the second device meets the link resource indication information, and when the local link resource information measured by the second device meets the link resource indication information, the second device sends the second measurement packet to a next device on the forwarding path, or when the local link resource information measured by the second device does not meet the link resource indication information, the second device sends a feedback message, to implement real-time monitoring on the packet forwarding path.

In some embodiments, in an embodiment, the receiving unit 730 is further configured to receive a feedback message.

The generation unit 710 is further configured to generate a third measurement packet, where the third measurement packet includes link resource indication information, and functions of the third measurement packet and the second measurement packet are the same, and the third measurement packet is used to re-determine a path that meets the link resource indication information. The link resource information is further used to indicate each node on a forwarding path of the third measurement packet to perform local link resource measurement.

An example process thereof is the same as a process of determining the forwarding path of the first measurement packet: The sending unit 720 is further configured to send the third measurement packet, so that when receiving the third measurement packet, the second device measures the local link resource information according to the link resource indication information in the third measurement packet, send the third measurement packet to the next device until the third measurement packet is sent to the third device, where the third measurement packet includes the local link resource information measured by the second device. After receiving the third measurement packet, the third device determines the path that meets the link resource indication information, and sends the information about the path to the first device. For a specific description process, refer to steps S101 to S106 in FIG. 2. For brief description, details are not described herein again.

The feedback message includes information indicating that the path does not meet the link resource indication information. When receiving the feedback message, the first device generates the third measurement packet, where the third measurement packet is used to re-determine a packet forwarding path.

Functions of functional units in the device may be implemented by using steps performed by the first device in the embodiments shown in FIG. 2 and FIG. 6. Therefore, a specific working process of the device provided as in this embodiment is not described herein again.

Figure 8:
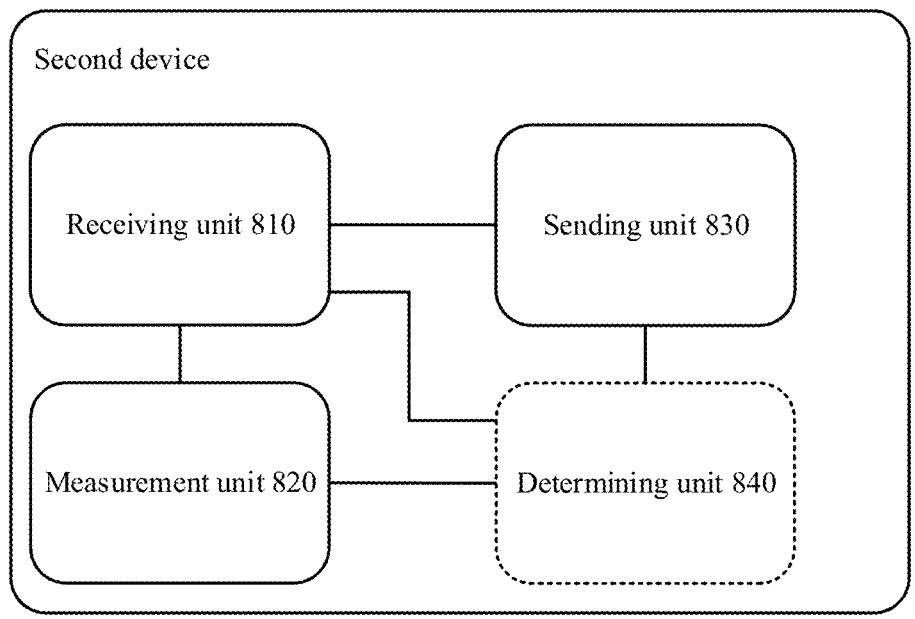
FIG. 8 is a schematic structural diagram of another device according to one embodiment.

FIG. 8 is a schematic structural diagram of another device according to one embodiment. As shown in FIG. 8, the device may be the sending device described in FIG. 1 to FIG. 6, that is, the second device. The device includes a receiving unit 810, a measurement unit 820, and a sending unit 830.

The receiving unit 810 is configured to receive a first measurement packet, where the first measurement packet includes link resource indication information, and the link resource indication information is used to indicate the device to perform local link resource measurement.

The measuring unit 820 is configured to measure local link resource information according to the link resource indication information.

The sending unit 830 is configured to send the first measurement packet, where the first measurement packet includes the local link resource information measured by the second device. Therefore, a third device that subsequently receives the first measurement packet determines, based on first measurement packets received from different forwarding paths, a path that meets the link resource indication information, to forward a packet. In addition, local link resource information of each node on the forwarding path is obtained without a need of extending a network protocol, and the path that meets the link resource indication information is determined, thereby relieving burden on a network control plane.

In some embodiments, the link resource indication information includes at least one of the following information: delay information, bandwidth information, packet loss rate information, jitter information, and the like.

In some embodiments, in an embodiment, the device further includes a determining unit 840.

The receiving unit 810 is further configured to receive a second measurement packet, where the second measurement packet includes link resource indication information, and the link resource indication information is used to indicate the device to perform local link resource measurement.

The determining unit 840 is configured to determine whether the local link resource information meets the link resource indication information.

When the local link resource information does not meet the link resource indication information, the sending unit 830 sends a feedback message, to implement real-time link monitoring.

When the local link resource information meets the link resource indication information, the sending unit 830 sends the second measurement packet, to implement real-time monitoring on a packet forwarding path. As in this embodiment, the second measurement packet is used to detect whether the packet forwarding path meets the link resource indication information.

In some embodiments, in another embodiment, the determining unit 840 spontaneously determines whether the local link resource information meets the link resource indication information. When the local link resource information does not meet the link resource indication information, the sending unit 830 sends the feedback message, to implement real-time link monitoring.

In some embodiments, in an embodiment, the receiving unit 810 is further configured to receive a third measurement packet, where the third measurement packet includes link resource indication information, used to indicate each node on a forwarding path of the third measurement packet to perform local link resource measurement. The third measurement packet and the first measurement packet have a same meaning. When a data packet cannot be forwarded on the packet forwarding path determined through the first measurement, or the link resource indication information is not met, the data packet forwarding path is re-determined by using the third measurement packet. A specific process is as follows:

The measuring unit 820 measures the local link resource information according to the link resource indication information.

The sending unit 830 sends the third measurement packet, where the third measurement packet includes the local link resource information measured by the second device. Therefore, a device subsequently receiving the third measurement packet re-determines, according to the third measurement packet, the packet forwarding path.

Functions of functional units in the device may be implemented by using steps performed by the second device, or referred to as a sending device, in the embodiments shown in FIG. 2 and FIG. 6. Therefore, a working process of the device provided as in this embodiment is not described herein again.

Figure 9:
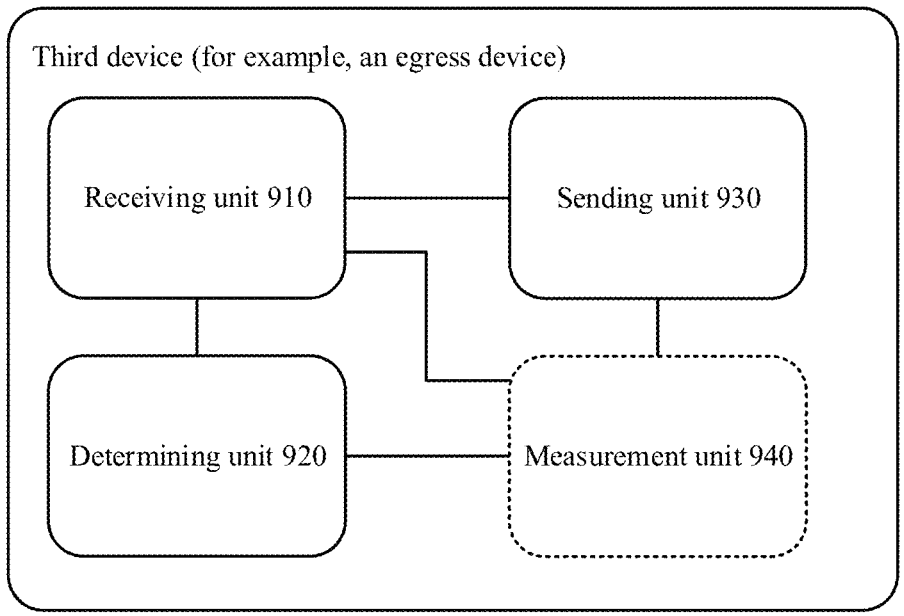
FIG. 9 is a schematic structural diagram of still another device according to one embodiment.

FIG. 9 is a schematic structural diagram of another device according to one embodiment. As shown in FIG. 9, the device may be the egress device described in FIG. 1 to FIG. 6, that is, the third device. The device includes a receiving unit 910, a determining unit 920, and a sending unit 930.

The receiving unit 910 is configured to receive a first measurement packet, where the first measurement packet includes link resource indication information and local link resource information measured by each node on a forwarding path of the first measurement packet, and the link resource indication information is used to indicate the device to perform local link resource measurement.

The determining unit 920 is configured to determine a packet forwarding path according to the link resource indication information and the local link resource information that is measured by each node on the forwarding path of the first measurement packet.

The sending unit 930 is configured to send information about the path, and then establish a fast channel that meets the link resource indication information, to implement fast packet forwarding. In addition, local link resource information of each node on the forwarding path is obtained without a need of extending a network protocol, and the path that meets the link resource indication information is determined, thereby relieving burden on a network control plane.

It should be noted that, as in this embodiment, the first measurement packet received by the receiving unit 910 may be measurement packets sent on at least two different forwarding paths. In other words, there may be two or more received first measurement packets.

In some embodiments, in an embodiment, the first measurement packet received by the receiving unit 910 may alternatively be a measurement packet on one forwarding path. In this case, the determining unit 920 determines that the path is a path for fast forwarding a data packet.

In some embodiments, as in this embodiment, the link resource indication information includes at least one of the following information: delay information, bandwidth information, packet loss rate information, and jitter information.

In some embodiments, in an embodiment, that the sending unit sends the information about the path includes:
the sending unit 930 sends the information about the path through a control channel.

In some embodiments, in another embodiment, that the sending unit sends the information about the path includes:
the sending unit 930 sends the information about the path through a data channel.

In some embodiments, in an embodiment, the device further includes a measurement unit 940.

The receiving unit 910 is further configured to receive a second measurement packet, where the second measurement packet includes link resource indication information, and the link resource indication information is used to indicate the device to perform local link resource measurement. The link resource indication information in the second measurement packet is used to determine whether the local link resource information measured by each node on the packet forwarding path determined in S101 to S106 in FIG. 2 further meets the link resource indication information.

The determining unit 920 measures the local link resource information according to the link resource indication information, and determines whether the local link resource information meets the link resource indication information.

When the local link resource information does not meet the link resource indication information, the sending unit 930 sends a feedback message. When the local link resource information meets the link resource indication information, the sending unit 930 sends the second measurement packet, where the second measurement packet includes the local link resource information measured by the measurement unit 940, to implement monitoring on the packet forwarding path.

In some embodiments, the determining unit 920 spontaneously determines whether the local link resource information meets the link resource indication information, and when the local link resource information does not meet the link resource indication information, the sending unit 930 sends the feedback message.

In some embodiments, the receiving unit 910 is further configured to receive a third measurement packet, where the third measurement packet includes link resource indication information and local link resource information measured by each node on a forwarding path of the first measurement packet, and the link resource indication information is used to indicate the device to perform local link resource measurement.

The determining unit 920 is further configured to re-determine a packet forwarding path according to the link resource indication information and the local link resource information that is measured by each node on the forwarding path of the at least one first measurement packet.

The sending unit 930 is further configured to send the information about the path, to re-determine the packet forwarding path.

Herein, the third measurement packet and the first measurement packet have a same function. When a packet cannot be forwarded on the packet forwarding path determined through the first measurement, or the link resource indication information is not met, the packet forwarding path is re-determined by using the third measurement packet. In this embodiment, there may be one, two, or more third measurement packets received by the receiving unit 910.

Functions of functional units in the device may be implemented by using steps performed by the third device in the embodiments shown in FIG. 2 and FIG. 6. Therefore, a specific working process of the device provided as in this embodiment is not described herein again.

Figure 10:
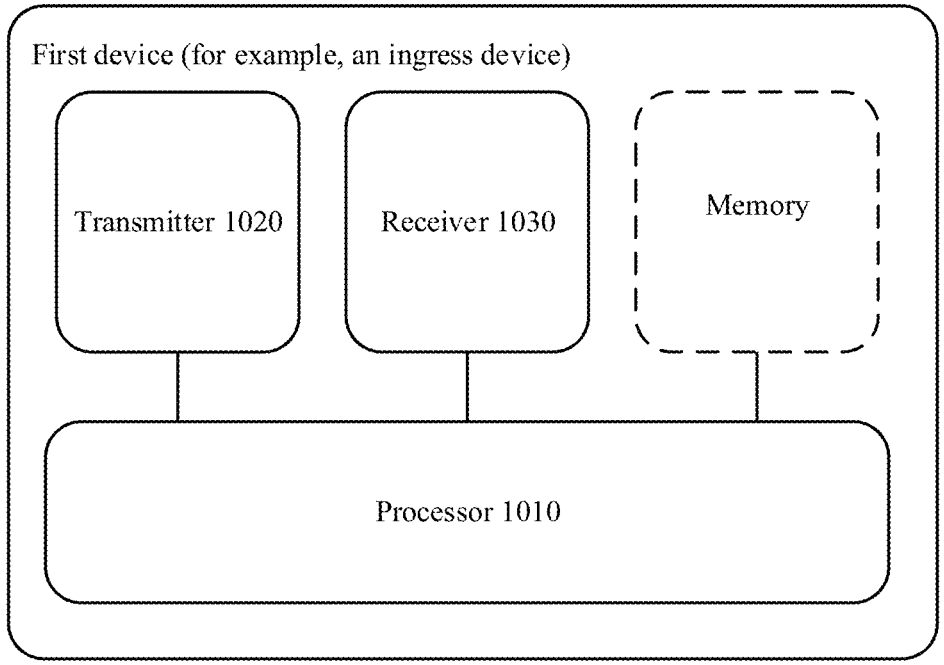
FIG. 10 is a schematic structural diagram of a device according to one embodiment.

FIG. 10 shows a device provided in an embodiment of this application. The device may be the ingress device described in FIG. 1 to FIG. 6, that is, the first device. As shown in FIG. 10, the device may include a processor 1010 and a transmitter 1020.

The processor 1010 is configured to generate a first measurement packet, where the first measurement packet includes link resource indication information, and the link resource indication information is used to indicate each node on a forwarding path of the first measurement packet to perform local link resource measurement.

The transmitter 1020 is configured to send the first measurement packet.

The transmitter 1020 sends the first measurement packet to next nodes on different forwarding paths until the first measurement packet is sent to a third device, so that the third device determines, based on local link resource information measured by each node on the forwarding path and the link resource indication information that are included in the first measurement packet, a packet forwarding path that meets the link resource indication information, sends the information about the path to the first device, or the first device and each node on the path, to establish, according to the information about the path, a fast forwarding tunnel for forwarding a packet. In addition, in a path determining process, the local link resource information measured by each node on the forwarding path of the first measurement packet can be obtained without a need of extending a network protocol, thereby relieving burden on a network control plane.

In some embodiments, the first measurement packet further includes link resource information of the first device.

In some embodiments, the link resource indication information includes at least one of the following information: delay information, bandwidth information, packet loss rate information, and jitter information.

In some embodiments, in an embodiment, the device further includes a receiver 1030, configured to receive a forwarding packet, where the forwarding packet is used to trigger the first device to generate the first measurement packet.

In some embodiments, in an embodiment, that the processor 1010 generates the first measurement packet includes: the processor 1010 replicates a packet header of the forwarding packet to generate the first measurement packet.

In some embodiments, in an embodiment, the processor 1010 is further configured to generate a second measurement packet, where the second measurement packet includes link resource indication information. Therefore, after receiving the second measurement packet, a receiver determines whether measured local link resource information measured by the second device meets the link resource indication information, and when the measured local link resource information meets the link resource indication information, the transmitter sends the second measurement packet to a next device on the forwarding path, or when the local link resource information measured by the second device does not meet the link resource indication information, the transmitter sends a feedback message, to implement monitoring on the packet forwarding path.

In some embodiments, the receiver 1030 is further configured to receive a feedback message.

The processor 1010 is further configured to generate a third measurement packet, where the third measurement packet includes link resource indication information, and the link resource indication information is further used to indicate each node on a forwarding path of the third measurement packet to perform local link resource measurement.

The transmitter 1020 is further configured to send the third measurement packet.

The feedback message includes information indicating that the path does not meet the link resource indication information. When receiving the feedback message, the first device generates the third measurement packet.

In this embodiment, the third measurement packet and the first measurement packet have a same function. When a packet cannot be forwarded on the packet forwarding path determined through the first measurement, or the link resource indication information is not met, the packet forwarding path is re-determined by using the third measurement packet.

Functions of functional components in the device may be implemented by using steps performed by the first device in the embodiments shown in FIG. 2 and FIG. 4. Therefore, a specific working process of the device provided as in this embodiment is not described herein again.

Figure 11:
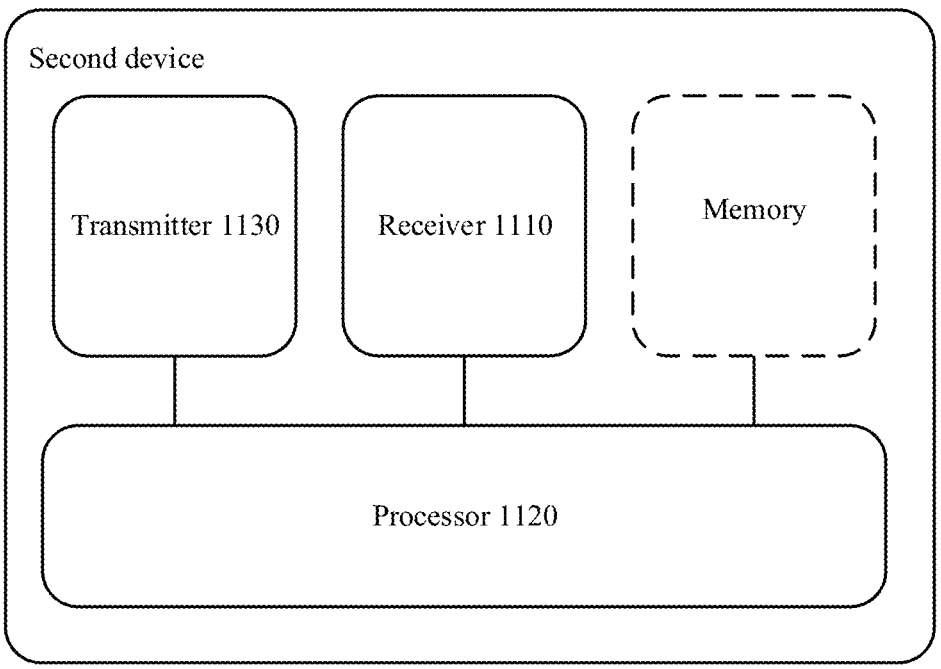
FIG. 11 is a schematic structural diagram of another device according to one embodiment.

FIG. 11 shows a device provided in an embodiment of this application. The device may be the sending device described in FIG. 1 to FIG. 6, that is, the second device. As shown in FIG. 11, the device may include a receiver 1110, a processor 1120, and a transmitter 1130.

The receiver 1110 is configured to receive a first measurement packet, where the first measurement packet includes link resource indication information, and the link resource indication information is used to indicate the device to perform local link resource measurement.

The processor 1120 is configured to measure local link resource information according to the link resource indication information.

The transmitter 1130 is further configured to send the first measurement packet, where the first measurement packet includes the local link resource information measured by the second device. A third device that subsequently receives the first measurement packet determines, based on first measurement packets received from different forwarding paths, a path that meets the link resource indication information, to forward a packet. In addition, local link resource information of each node on the forwarding path is obtained without a need of extending a network protocol, and the path that meets the link resource indication information is determined, thereby relieving burden on a network control plane.

In some embodiments, the link resource indication information includes at least one of the following information: delay information, bandwidth information, packet loss rate information, jitter information, and the like.

In some embodiments,
the receiver 1110 is further configured to receive a second measurement packet, where the second measurement packet includes link resource indication information, and the second measurement packet is used to detect whether a packet forwarding path meets the link resource indication information.

The processor 1120 is further configured to: measure the local link resource information according to the link resource indication information, and determine whether the local link resource information meets the link resource indication information.

The transmitter 1130 is further configured to: when the local link resource information meets the link resource indication information, send the second measurement packet, where the second measurement packet includes the local link resource information measured by the second device, to monitor the packet forwarding path.

In some embodiments, the transmitter 1130 is further configured to send a feedback message when the local link resource information does not meet the link resource indication information.

In some embodiments, in an embodiment, the processor 1120 may further spontaneously determine whether the local link resource information meets the link resource indication information, and when the local link resource information does not meet the link resource indication information, the transmitter 1130 sends the feedback message.

In some embodiments, in an embodiment,
the receiver 1110 is further configured to receive a third measurement packet, where the third measurement packet includes link resource indication information, and the link resource indication information is used to indicate the device to perform local link resource measurement.

The processor 1120 is further configured to measure the local link resource information according to the link resource indication information.

The transmitter 1130 is further configured to send the third measurement packet, where the third measurement packet includes the local link resource information measured by the second device. Therefore, a device subsequently receiving the third measurement packet re-determines, according to the third measurement packet, the packet forwarding path.

In this embodiment, the third measurement packet and the first measurement packet have a same function. When a packet cannot be forwarded on the packet forwarding path determined through the first measurement, or the link resource indication information is not met, the packet forwarding path is re-determined by using the third measurement packet.

Functions of functional components in the device may be implemented by using steps performed by the second device in the embodiments shown in FIG. 2 and FIG. 4. Therefore, a specific working process of the device provided as in this embodiment is not described herein again.

Figure 12:
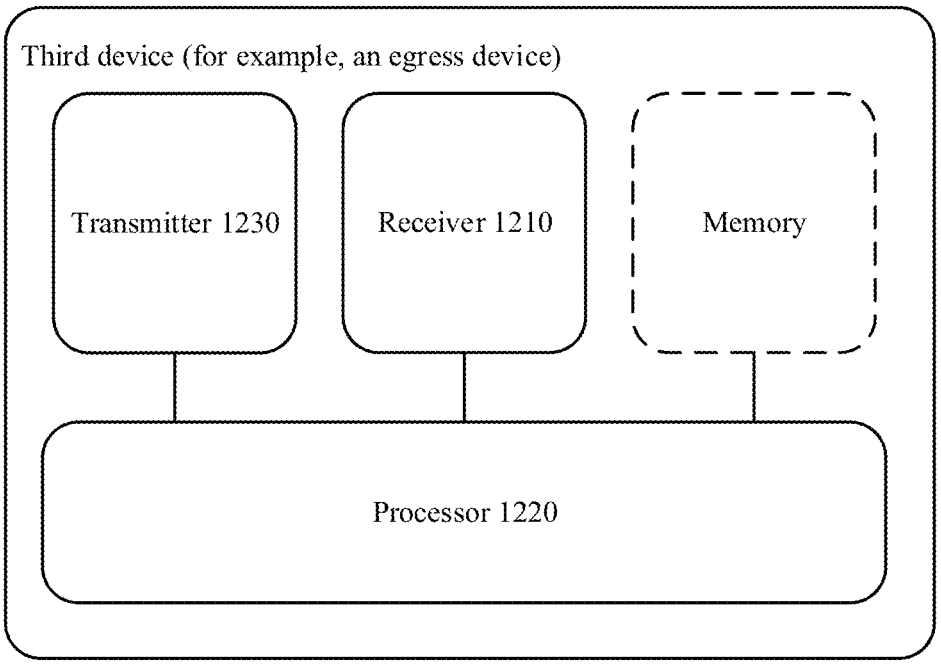
FIG. 12 is a schematic structural diagram of still another device according to one embodiment.

FIG. 12 shows a device provided in one embodiment. The device may be the egress device described in FIG. 1 to FIG. 6, that is, the third device. As shown in FIG. 10, the device may include a receiver 1210, a processor 1220, and a transmitter 1230. According to a ninth aspect, a device is provided, where the device includes:

The receiver 1210 is configured to receive a first measurement packet, where the first measurement packet includes link resource indication information and local link resource information measured by each node on a forwarding path of the first measurement packet, and the link resource indication information is used to indicate the device to perform local link resource measurement.

The processor 1220 is configured to determine a packet forwarding path according to the link resource indication information and the local link resource information that is measured by each node on the forwarding path of the first measurement packet.

The transmitter 1230 is further configured to send information about the path, and then establish a fast channel that meets the link resource indication information, to implement fast packet forwarding. In addition, local link resource information of each node on the forwarding path is obtained without a need of extending a network protocol, and the path that meets the link resource indication information is determined, thereby relieving burden on a network control plane.

It should be noted that, as in this embodiment, the receiver 1210 receives first measurement packets sent on different forwarding paths. In other words, there may be one, two, or more received first measurement packets.

In some embodiments, in an embodiment, the link resource indication information includes at least one of the following information: delay information, bandwidth information, packet loss rate information, and jitter information.

In some embodiments, in an embodiment, that the transmitter 1230 is configured to send the information about the path includes:
the transmitter 1230 sends the information about the path through a control channel.

In some embodiments, in another embodiment, that the transmitter 1230 sends the information about the path includes:
the transmitter 1230 sends the information about the path through a data channel.

In some embodiments, in an embodiment,
the receiver 1210 is further configured to receive a second measurement packet, where the second measurement packet includes link resource indication information, and the link resource indication information is used to indicate the device to perform local link resource measurement.

The processor 1220 is further configured to: measure the local link resource information according to the link resource indication information, and determine whether the local link resource information meets the link resource indication information.

The transmitter 1230 is further configured to send a feedback message when the local link resource information does not meet the link resource indication information, to monitor the packet forwarding path.

In some embodiments, the processor 1220 spontaneously determine whether the local link resource information meets the link resource indication information, and when the local link resource information does not meet the link resource indication information, the transmitter 1230 sends the feedback message.

In some embodiments, the receiver 1210 is configured to receive at least one third measurement packet, where the third measurement packet includes link resource indication information and local link resource information measured by each node on a forwarding path of the first measurement packet, and the link resource indication information is used to indicate the device to perform local link resource measurement.

The processor 1220 is further configured to re-determine a packet forwarding path according to the link resource indication information and the local link resource information that is measured by each node on the forwarding path of the at least one first measurement packet.

The transmitter 1230 is further configured to send the information about the path, to re-determine the packet forwarding path.

In this embodiment, the third measurement packet and the first measurement packet have a same function. When a packet cannot be forwarded on the packet forwarding path determined through the first measurement, or the link resource indication information is not met, the packet forwarding path is re-determined by using the third measurement packet.

It should be noted that, in this embodiment, the receiver 1210 may receive one, two, or more, that is, at least one third measurement packet.

Functions of functional components in the device may be implemented by using steps performed by the third device in the embodiments shown in FIG. 2 and FIG. 4. Therefore, a specific working process of the device provided as in this embodiment is not described herein again.

In some embodiments, in an embodiment, FIG. 10, FIG. 11, and FIG. 12 may further include a memory, configured to store an instruction and data.

In some embodiments, in an embodiment, the devices in FIG. 10, FIG. 11, and FIG. 12 may include a processor. The processor is coupled to the memory, and reads and executes an instruction in the memory, to complete method steps corresponding to the first device, the second device, and the third device in FIG. 2 to FIG. 6. For brevity, details are not described herein again.

It should be noted that, as in this embodiment, the receiver and the memory included in the devices in FIG. 10, FIG. 11, and FIG. 12 may be a component, for example, a transceiver, that can not only receive an instruction and data, but also send the instruction and data. As in this embodiment, the receiver and the transmitter may be one or more communications interfaces.

An embodiment in accordance with the disclosure further provides a system. The system includes the first device in FIG. 10, the second device in FIG. 11, and the third device in FIG. 12.

An embodiment in accordance with the disclosure further provides a computer-readable storage medium. The computer-readable storage medium stores a computer program, and when the computer program is executed by a processor, the methods in FIG. 2 to FIG. 6 are implemented.

An embodiment in accordance with the disclosure further provides a computer program product including an instruction. When the instruction is run on a computer, the computer is enabled to perform the methods in FIG. 2 to FIG. 6.

All or some of the foregoing embodiments may be implemented by using software, hardware, firmware, or any combination thereof. When software is used to implement the embodiments, the embodiments may be implemented completely or partially in a form of a computer program product. The computer program product includes one or more computer instructions. When the computer program instructions are loaded and executed on the computer, the procedure or functions according to the embodiments are all or partially generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope in accordance with the disclosure.

What is claimed is:

1. A packet forwarding path determining method, wherein the method comprises:
   generating, by a first device, a first measurement packet based on a received data packet, the first measurement packet including link resource indication information, wherein the received data packet includes a source address of a source device from which the received data packet was received and a target address, wherein the link resource indication information is configured to indicate each node on a forwarding path of the first measurement packet to perform local link resource measurement, and wherein the link resource indication information specifies at least one requirement that must be met by a link for sending the received data packet; and
   sending, by the first device, the first measurement packet to a target device having the target address.

2. The method according to claim 1, wherein the first measurement packet further includes link resource information of the first device.

3. The method according to claim 1, wherein the link resource indication information includes at least one of the following information: delay information, bandwidth information, packet loss rate information, or jitter information.

4. A packet forwarding path determining method, wherein the method comprises:
- receiving, by a second device, a first measurement packet that is based on a received data packet, the first measurement packet including link resource indication information, wherein the first measurement packet includes a source address of a source device from which the received data packet was received and a target address, wherein the link resource indication information is configured to indicate the second device to perform local link resource measurement and wherein the link resource indication information specifies at least one requirement that must be met by a link for sending the received data packet;
- measuring, by the second device, local link resource information according to the link resource indication information; and
- sending, by the second device, the first measurement packet including the local link resource information measured by the second device to a target device having the target address.

5. The method according to claim 4, wherein the link resource indication information includes at least one of the following information: delay information, bandwidth information, packet loss rate information, or jitter information.

6. A packet forwarding path determining method, wherein the method comprises:
- receiving, by a third device, a first measurement packet that is based on a received data packet, the first measurement packet including link resource indication information and local link resource information measured by each node on a forwarding path of the first measurement packet, wherein the first measurement packet includes a source address of a source device from which the received data packet was received and a target address, wherein the link resource indication information is configured to indicate the third device to perform local link resource measurement and wherein the link resource indication information specifies at least one requirement that must be met by a link for sending the received data packet;
- determining, by the third device, a packet forwarding path according to the link resource indication information, and the local link resource information measured by each node on the forwarding path of the first measurement packet; and
- sending, by the third device, information about the path to a target device having the target address.

7. The method according to claim 6, wherein the link resource indication information includes at least one of the following information: delay information, bandwidth information, packet loss rate information, or jitter information.

8. The method according to claim 6, wherein sending, by the third device, the information about the path comprises:
- sending, by the third device, the information about the path through a control channel or a data channel.

* * * * *